US010525959B2

(12) United States Patent
Knechtges et al.

(10) Patent No.: US 10,525,959 B2
(45) Date of Patent: Jan. 7, 2020

(54) ELECTROHYDRAULIC MOTOR VEHICLE BRAKING SYSTEM

(71) Applicant: Lucas Automotive GmbH, Koblenz (DE)

(72) Inventors: Carsten Knechtges, Mayen (DE); Josef Knechtges, Mayen (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 0 days.

(21) Appl. No.: 15/576,153

(22) PCT Filed: Apr. 13, 2016

(86) PCT No.: PCT/EP2016/058055
§ 371 (c)(1),
(2) Date: Nov. 21, 2017

(87) PCT Pub. No.: WO2016/184616
PCT Pub. Date: Nov. 24, 2016

(65) Prior Publication Data
US 2018/0148031 A1   May 31, 2018

(30) Foreign Application Priority Data
May 21, 2015 (DE) .................. 10 2015 006 853

(51) Int. Cl.
*B60T 13/74*        (2006.01)
*B60T 8/40*         (2006.01)
(Continued)

(52) U.S. Cl.
CPC ............ *B60T 13/745* (2013.01); *B60T 7/042* (2013.01); *B60T 8/4077* (2013.01);
(Continued)

(58) Field of Classification Search
CPC ...... B60T 13/74; B60T 13/741; B60T 13/745; B60T 8/4081; B60T 8/4086; B60T 8/709; B60T 7/042; B60T 2270/82
See application file for complete search history.

(56) References Cited

U.S. PATENT DOCUMENTS 5,609,399 A    3/1997 Feigel et al.
5,713,640 A *  2/1998 Feigel .................. B60T 8/3265
                                              303/115.2
(Continued)

FOREIGN PATENT DOCUMENTS

DE    4310061 A1    9/1994
DE    10330146 A1   1/2005
(Continued)

OTHER PUBLICATIONS

German Search Report, Application No. DE 102015006853.9, dated Oct. 30, 2015.
(Continued)

*Primary Examiner* — Thomas J Williams
(74) *Attorney, Agent, or Firm* — MacMillan, Sobanski & Todd, LLC

(57) ABSTRACT

The invention relates to an electrohydraulic motor vehicle braking system and to a method for operating an electrohydraulic motor vehicle braking system. Said electrohydraulic braking system comprises a first brake circuit with at least one wheel brake, a second brake circuit with at least one wheel brake, a first cylinder-piston assembly being designed to be fluidically coupled to at least one of the first or second brake circuits and which is used to produce hydraulic pressure in at least one of the first or second brake circuits; the first cylinder-piston assembly comprises at least one first piston, a second piston-cylinder assembly comprises at least one second piston, and a electromechanical actuator which acts on the second piston of the second cylinder-piston assembly; the second cylinder-piston assembly is designed to be fluidically coupled to the first cylinder-piston assembly in order to provide hydraulic pressure for actuating the first piston-cylinder assembly and generated in the second piston-cylinder assembly when actuating the electromechanical actuator; and the second piston-cylinder assembly is
(Continued)

designed to be fluidically coupled to the first brake circuit and/or to the second brake circuit such that when actuating the electromechanical actuator in the second piston-cylinder assembly, the first and/or the second brake circuit can be impinged upon with hydraulic pressure generated in the second piston-cylinder assembly.

16 Claims, 1 Drawing Sheet

(51) Int. Cl.
*B60T 13/68* (2006.01)
*B60T 7/04* (2006.01)

(52) U.S. Cl.
CPC .......... *B60T 8/4081* (2013.01); *B60T 13/686* (2013.01); *B60T 2270/403* (2013.01); *B60T 2270/404* (2013.01); *B60T 2270/82* (2013.01)

(56) References Cited

U.S. PATENT DOCUMENTS

| | | | |
|---|---|---|---|
| 7,922,264 B2* | 4/2011 | Baumann | B60T 8/4081 |
| | | | 303/114.1 |
| 8,424,976 B2* | 4/2013 | Dinkel | B60T 7/042 |
| | | | 188/359 |
| 9,227,611 B2 | 1/2016 | Gilles | |
| 9,637,102 B2 | 5/2017 | Drumm et al. | |
| 10,029,663 B2* | 7/2018 | Knechtges | B60T 8/4077 |
| 2013/0234501 A1 | 9/2013 | Leiber | |
| 2013/0234502 A1 | 9/2013 | Drumm | |
| 2017/0232948 A1* | 8/2017 | Leiber | B60T 8/4081 |
| | | | 303/11 |

FOREIGN PATENT DOCUMENTS

| | | | |
|---|---|---|---|
| DE | 102010040722 A1 * | 3/2012 | ............ B60T 7/042 |
| DE | 102010050133 A1 | 5/2012 | |
| DE | 102011086258 A1 | 5/2012 | |
| DE | 102011086916 A1 | 5/2012 | |
| DE | 102012202645 A1 | 10/2012 | |
| DE | 102011077169 A1 | 12/2012 | |
| DE | 102012212836 A1 | 2/2013 | |
| DE | 102011086986 A1 | 5/2013 | |
| WO | 2012/062393 A1 | 5/2012 | |
| WO | 2012/152352 A1 | 11/2012 | |

OTHER PUBLICATIONS

PCT International Search Report and the Written Opinion, Application No. PCT/EP2016/058055 filed Apr. 13, 2016, dated Nov. 7, 2016.
PCT International Preliminary Report on Patentability, Application No. PCT/EP2016/058055 filed Apr. 13, 2016, dated May 3, 2017.

* cited by examiner

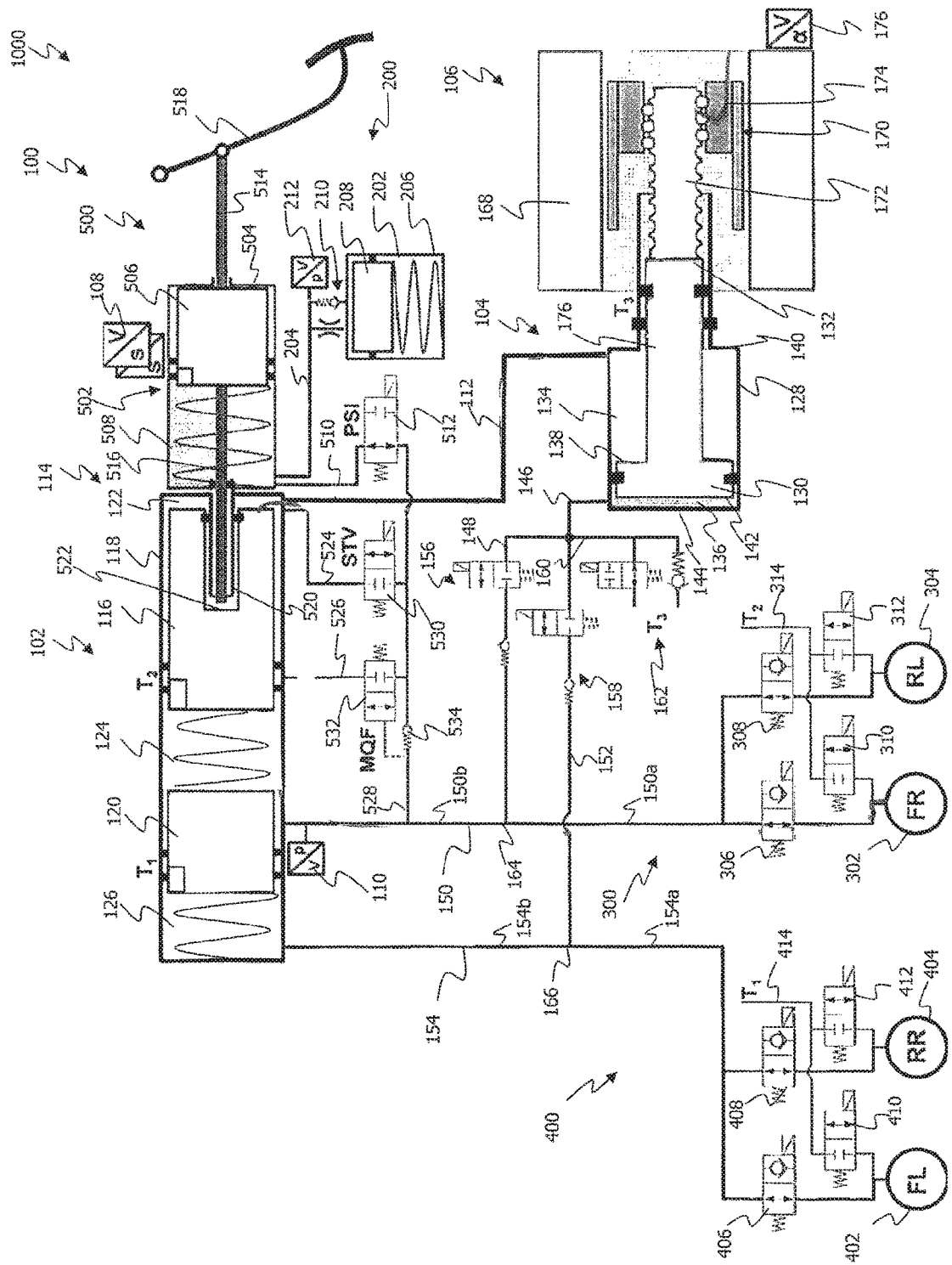

ELECTROHYDRAULIC MOTOR VEHICLE BRAKING SYSTEM

CROSS-REFERENCE TO RELATED APPLICATIONS

This application is the National Phase of International Application PCT/EP2016/058055 filed Apr. 13, 2016, which designated the U.S. That International Application was published in English under PCT Article 21(2) on Nov. 24, 2016 as International Publication Number WO 2016/184616A1. PCT/EP2016/058055 claims priority to German Application No. 10 2015 006 853.9 filed May 21, 2015. Thus, the subject nonprovisional application also claims priority to German Application No. 10 2015 006 853.9 filed May 21, 2015. The disclosures of both applications are incorporated herein by reference.

BACKGROUND OF THE INVENTION

The present disclosure relates generally to the field of brake systems. Specifically, an electrohydraulic motor vehicle brake system is described. Modern motor vehicle brake systems operate by the "brake-by-wire" principle. This means that a hydraulic pressure is built up at the wheel brakes, independently of the foot force, via a hydraulic pressure generator. Brake-by-wire brake systems have a number of advantages. For example, they are outstandingly suitable for the installation of energy recovery systems. Furthermore, such brake systems allow better control of the build-up of brake pressure at each individual wheel and better integration of vehicle dynamics management programs (e.g. ABS, ASR, ESP programs).

Examples of the implementation of brake-by-wire brake systems are known from WO 2012/062393 A1 and WO 2012/152352 A1. The electrohydraulic brake systems taught therein have different brake circuits which are controllable by means of hydraulic fluid, or a hydraulic fluid pressure. Known hydraulic pressure generators further comprise a cylinder-piston device for generating hydraulic pressure, and an electromechanical actuator which acts on the piston of the cylinder-piston device. The electromechanical actuator is arranged downstream of the cylinder-piston device and coupled directly with the piston of the cylinder-piston device. The piston can thus be operated directly via the actuator, so that a hydraulic pressure can be built up at the wheel brakes independently of the foot force. The cylinder-piston device can further be coupled via a force transmission device with a pedal interface. In the case of emergency operation of the brake system (e.g. in the event of failure of the electromechanical actuator or the controller thereof), the force transmission device allows the cylinder-piston device to be mechanically coupled with the brake pedal interface in order to allow the piston of the cylinder-piston device to be operated by means of the foot force present at the pedal interface (push-through operation).

Further examples of electrohydraulic brake systems are to be found in DE 10 2011 086 986 A1, DE 10 2011 086 258 A1 and DE 10 2012 212 836 A1.

The brake circuits of an electrohydraulic brake system are to be completely fluidically separated from one another in an inexpensive and space-optimized manner. It is thereby to be ensured that the same hydraulic pressure is present, or can be maintained, in the brake circuits completely fluidly separated from one another.

SUMMARY OF THE INVENTION

The electrohydraulic motor vehicle brake system comprises a first brake circuit with at least one wheel brake and a second brake circuit with at least one wheel brake. A first cylinder-piston device for generating hydraulic pressure in at least one of the first or second brake circuit is to be fluidly coupled with at least one of the first and second brake circuit.

The first cylinder-piston device comprises at least one first piston. A second cylinder-piston device comprises at least one second piston. An electromechanical actuator acts on the second piston of the second cylinder-piston device. The second cylinder-piston device is to be fluidly coupled with the first cylinder-piston device in order to provide a hydraulic pressure which is generated in the second cylinder-piston device upon an operation of the electromechanical actuator for an operation of the first cylinder-piston device. In addition, the second cylinder-piston device is to be fluidly coupled with the first brake circuit and/or the second brake circuit in such a manner that upon an operation of the electromechanical actuator the first and/or the second brake circuit are to be directly applied with a hydraulic pressure which is generated in the second cylinder-piston device.

The second cylinder-piston device can provide the brake system with a hydraulic pressure for hydraulic operation of the first piston of the first cylinder-piston device. The extent of the operating pressure that is provided specifies the degree of operation, or the extent of movement, of the first piston and thus the hydraulic pressure generated at the wheel brakes of the two brake circuits.

The second cylinder-piston device can also apply the hydraulic pressure generated therein to the first brake circuit and the second brake circuit directly and thus without the interposition of the first cylinder-piston device. The second cylinder-piston device is accordingly configured to apply a predetermined volume of hydraulic fluid, and thus hydraulic pressure, to the two fluidly separate brake circuits directly. The fluid separation of the two brake circuits is advantageous from the point of view of safety. Should a fault or a malfunction occur in one of the brake circuits, the functioning of the respective other brake circuit is not impaired. When one of the two brake circuits is acted on directly by means of the second cylinder-piston device, at least a portion of the volume of hydraulic fluid delivered from the second cylinder-piston device can be supplied to the first cylinder-piston device in order to ensure that at least approximately the same hydraulic pressure is present at both brake circuits.

A detected braking intention by the driver or a vehicle dynamics management program determines the hydraulic pressure to be provided by the second cylinder-piston device. In brake-by-wire operation of the brake system, operation of the first piston takes place independently of the foot force with the aid of the electromechanical actuator, which operates the second piston of the second cylinder-piston device.

The second piston of the second cylinder-piston device can divide the cylinder of the second cylinder-piston device into a first hydraulic chamber and a second hydraulic chamber. Depending on the architecture of the brake system and depending on the configuration of the second cylinder-piston device, it is possible to fluidly couple the first hydraulic chamber and the second hydraulic chamber of the second cylinder-piston device with in each case one of the brake circuits or with the first cylinder-piston device. Accordingly, the first hydraulic chamber can be fluidly coupled with the first cylinder-piston device. Alternatively, the first hydraulic chamber can be fluidly coupled with the first brake circuit and/or the second brake circuit. The second hydraulic chamber can be fluidly coupled with the first cylinder-piston device. The second hydraulic chamber can further also be fluidly coupled with the first and/or the second brake circuit.

In order to change the volume of the first hydraulic chamber and of the second hydraulic chamber, the second piston of the second cylinder-piston device can be displaceable in a first operating direction and in a second operating direction. For example, the first operating direction can be associated with the first brake circuit and the second operating direction can be associated with the second brake circuit. However, the first operating direction can also be associated with the first cylinder-piston device. In this case, the second operating direction can then be associated with the first brake circuit and the second brake circuit, for example. The flow of the hydraulic fluid can be controlled via valve arrangements.

At least one sensor unit can be associated with the electrohydraulic brake system. The at least one sensor unit can serve to detect the position of the electromechanical actuator. The sensor unit can detect an angular position of the actuator, for example. Using the position detected by the at least one sensor unit, the position of the second piston inside the cylinder of the second cylinder-piston device can be determined. The volumes of the first hydraulic chamber and of the second hydraulic chamber, or the change in those volumes, can thereby be determined. The sensor unit can have an encoder, for example. The sensor unit can further comprise a Hall sensor and at least one magnet, whereby the magnet can be provided on a rotatable element of the actuator. The Hall sensor can then generate an output signal when the magnetic field of the magnet acts on the Hall sensor. In this manner, the position of the electromechanical actuator can likewise be determined.

The electrohydraulic brake system can further have at least one control unit. The control unit can serve to electrically control the electromechanical actuator. The control unit can be configured to evaluate measured variables indicating a driver's intention to brake and/or a driving condition of the motor vehicle and to deliver corresponding control commands for the actuator. On the basis of the evaluated sensor signals, the control unit can correspondingly control the electromechanical actuator in order to generate an operating pressure in the second cylinder-piston device. The intention to brake can be detected by the sensor unit at the brake pedal or in a pedal interface and converted by an electronic control unit of the brake system into corresponding operating signals for the electromechanical actuator. The intention to brake can be determined, for example, by detection of a brake pedal path and/or of an operating force acting on the brake pedal. The vehicle dynamics management program, such as, for example, an anti-lock braking system (ABS), a traction control system (ASR), an electronic stability program (ESP), also referred to as vehicle stability control (VSP), or an adaptive cruise control system (ACC), can be lodged in the electronic control unit. It is able to deliver commands for the electromechanical actuator on the basis of detected sensor data indicating a driving condition of the vehicle. In push-through operation, operation of the at least one first piston of the first cylinder-piston device takes place in dependence on the foot force.

The at least one control unit can be configured to determine the position of the second piston of the second cylinder-piston device on the basis of the signals of the at least one sensor unit. It must be possible to determine the position of the second piston in particular in the course of vehicle dynamics management, such as, for example, ABS- and/or ASR- and/or ESP-controlled operation, because, in the case of vehicle dynamics management, hydraulic fluid is discharged into the hydraulic fluid reservoir in a controlled manner via the respective brake circuits. Accordingly, it must be possible to determine the volume of hydraulic fluid in the brake circuits. By means of the sensor unit, the position of the actuator and thus the position of the second piston in the cylinder of the second cylinder-piston device can be detected. Using the position of the second piston, the volumes of the first hydraulic chamber and of the second hydraulic chamber of the second cylinder-piston device can be determined via the control unit. On the basis of the volumes of the hydraulic chambers, or on the basis of the position of the second piston, it is possible to know what volume of hydraulic fluid is currently in the first brake circuit and in the second brake circuit.

Upon operation of one of the wheel brakes in one of the brake circuits within the scope of vehicle dynamics management (ABS, ESR, ASR), the volume of hydraulic fluid in the brake circuit with the operated wheel brake can change, as already mentioned, because hydraulic fluid can be discharged in a controlled manner into the hydraulic fluid reservoir in the case of vehicle dynamics management. If a change in the volume of hydraulic fluid in one of the brake circuits is detected on the basis of the position of the second piston in conjunction with the position of the electromechanical actuator, the second piston can be operated by the actuator and equalize this change in volume and the associated difference in hydraulic pressure between the brake circuits. If, for example, there is too little hydraulic fluid in the second brake circuit or if the hydraulic pressure at this brake circuit is too low, the missing hydraulic fluid volume can be supplied to the first cylinder-piston device via the second piston by means of a forward stroke or a return stroke. The equalization of the difference in hydraulic pressure between the first brake circuit and the second brake circuit can also be in the above example by building up pressure in the first brake circuit by means of the second piston.

In this connection, the control unit can further be so configured that the distribution of the volume of hydraulic fluid delivered from the second cylinder-piston device between the first brake circuit, the second brake circuit and/or the first cylinder-piston device can be specified on the basis of the signals of the at least one sensor unit. In other words, it is possible to divide a volume flow generated by a piston stroke of the second piston as specified by the control unit. A volume stream generated by a piston stroke can, for example, serve with a part volume stream to build up pressure at one of the wheel brakes in a brake circuit. That part volume stream can be variably adjusted to be larger or smaller, or increased or reduced, via valves controlled by the control unit. The other part volume stream can be supplied to the first cylinder-piston device. In other words, that part volume stream can serve to supply hydraulic fluid to the first cylinder-piston device. The distribution of the volume displaced from the cylinder of the second cylinder-piston device can be controlled via a valve arrangement, for example.

The at least one control unit can further be configured to detect the relative positions of the first piston and of a secondary piston of the first cylinder-piston device relative to one another on the basis of the signals of the at least one sensor unit. The detected relative positions of the first piston and of the secondary piston of the first cylinder-piston device are required inter alia to maintain the same hydraulic pressure in each of the first brake circuit and the second brake circuit. The position of the secondary piston, which can be received in a floating manner in the cylinder of the first cylinder-piston device, can indicate the pressure ratio between the two brake circuits. In other words, the position of the secondary piston relative to the first piston can change depending on how often pressure has been built up or lowered in the individual brake circuits within the scope of vehicle dynamics management (ABS, ESR, ASR). The relative positions of the first piston and of the secondary piston can be detected, for example, with the aid of the position of the electromechanical actuator detected by the at least one sensor unit. If, for example, pressure has been built up more frequently in the second brake circuit within the scope of vehicle dynamics management (ABS, ESR, ASR), the position of the secondary piston can be displaced relative to the first piston, since the second brake circuit now contains less hydraulic fluid volume. This missing hydraulic fluid volume must be supplied to the second brake circuit. This supply can take place, for example, via pressure build-up operations in the first brake circuit. The position of the secondary piston relative to the first piston is thereby changed, that is to say the secondary piston can be moved back into its starting position again. The supply of hydraulic fluid volume for the brake circuits takes place sequentially, that is to say a volume is first supplied to the first brake circuit. Subsequently, a volume is supplied to the second brake circuit. The order in which the brake circuits are supplied is not important. It is also possible first to supply the second brake circuit before the first brake circuit is supplied.

The first piston of the first cylinder-piston device and the second cylinder-piston device can be fluidly coupled with the one another via a fluid path of the brake system. The first piston and the second piston can be fluidly connected in series via the fluid path. A hydraulic fluid displaced from the second cylinder-piston device upon operation of the second piston can pass via the fluid path to the first piston of the first cylinder-piston device, whereby the first piston is operated. Mechanical operation of the second piston can thus be converted into hydraulic operation of the first piston. Because the hydraulic fluid located in the fluid path and in the second cylinder-piston device is not compressible, any electromechanical operation of the second piston is converted without loss into a corresponding hydraulic operation of the first piston. In particular, the operating pressure present at the operated second piston can correspond to the operating pressure present at the first piston.

The second cylinder-piston device can be connected via a fluid path directly to the first brake circuit and via a further fluid path directly to the second brake circuit. The fluid paths can each contain at least one controllable valve. The valves can be controlled by the control unit. For example, valve arrangements composed, for example, of a non-return valve and an electrically operable or controllable valve can also be provided in each fluid path. A hydraulic fluid displaced from the second cylinder-piston device on operation of the second piston can be supplied via the corresponding fluid path directly to the first brake circuit or directly to the second brake circuit so that, for example, one of the wheel brakes of the corresponding brake circuit can be operated.

The second piston of the second cylinder-piston device can be formed with a first active surface and a second active surface, each of which is provided for displacing hydraulic fluid from the cylinder of the second cylinder-piston device. The first active surface and the second active surface of the second piston can be in a predetermined ratio to one another in terms of their surface area. The ratio can depend on whether the corresponding active surface is associated with one of the brake circuits or with the first cylinder-piston device. For example, the first active surface of the second piston can be associated with the first cylinder-piston device. In this case, the first piston of the first cylinder-piston device and the first active surface of the second piston can be of the same size. The second piston can, however, also have a smaller or larger active surface than the first piston. A transformation for the operating forces acting on the first piston and the second piston can be specified via the dimensions of the active surfaces of the first piston and of the second piston because, by coupling the at least one first piston in series with the second piston, the hydraulic pressure generated in the second cylinder-piston device by displacement of the second piston can act on both pistons. The operating force effectively present at or to be applied to the first piston and the second piston can then be given by the product of the generated operating pressure and the particular piston surface on which the operating pressure acts.

According to the preceding example, the active surface of the second piston can be made smaller compared to the active surface of the first piston. In this case, the operating force present at the first cylinder in the case of a generated hydraulic pressure can be greater than the operating force present at or to be applied to the second piston by a factor which can be calculated from the ratio of the two active surfaces of the first and the second piston. For example, by connecting a larger first piston in series with a smaller second piston, a hydraulic force intensification can be achieved. In order to build up a specific hydraulic pressure at the wheel brakes, an operating force that is smaller than the operating force to be applied to the first piston by the factor of the active surface ratio merely has to be applied to the second piston. As a result of the hydraulic force intensification, the motor torque and also the spindle and bearing forces of the electromechanical actuator can thus be kept smaller in order to generate a given hydraulic pressure in comparison with an unintensified system.

The electrohydraulic brake system can further comprise a pedal interface, couplable with a brake pedal, having a third cylinder-piston device, which is optionally couplable with the first cylinder-piston device in order to generate hydraulic pressure. In push-through operation of the brake system, the third cylinder-piston device can be coupled with the first cylinder-piston device. In brake-by-wire operation of the brake system, on the other hand, the third cylinder-piston device can be decoupled from the first cylinder-piston device. Coupling can thereby be effected mechanically. For example, the brake system can comprise a mechanical coupling device (or force transmission device) which is designed mechanically to couple the first piston of the first cylinder-piston device with the third piston of the third cylinder-piston device.

The third piston of the third cylinder-piston device can be coupled with the brake pedal. In this manner, the operating force applied to the brake pedal can be transmitted directly to the first piston. Thus, in push-through operation of the brake system, a hydraulic pressure can be built up at the wheel brakes fluidly coupled with the first cylinder-piston device directly via the foot force present at the brake pedal.

In dependence on the operating signals or commands, the electromechanical actuator can move the second piston and thus generate a hydraulic operating pressure for the at least one first piston. The generation of the operating pressure can here not merely be limited to the generation of a desired pressure value in order to specify the strength of the operation of the first piston. Rather, by correspondingly controlling the electromechanical actuator, the duration and/or the speed of the operation of the second piston can also be specified. Accordingly, the speed and/or the duration of the operation of the at least one first piston can also be specified solely via the operating pressure provided (and thus independently of the foot force). By correspondingly regulating the operating pressure provided in the second cylinder-piston device in terms of time, the hydraulic operation of the first piston can be controlled in terms of time. Any desired hydraulic pressure build-up, hydraulic pressure maintenance and/or hydraulic pressure reduction phases can thus be achieved.

In the mounted state, the first cylinder-piston device and the third cylinder-piston device of the brake system can be arranged spatially in succession (in series) and, for example, form an assembly group which can be handled separately. The third cylinder-piston device which can be associated with the brake pedal can hereby be arranged, when viewed from the brake pedal, in front of the first cylinder-piston device. The third cylinder-piston device and the first cylinder-piston device can be arranged coaxially with one another.

Furthermore, the first cylinder-piston device and the second cylinder-piston device can be arranged spatially substantially parallel to one another and, for example, form an assembly group which can be handled separately. In other words, the first and third cylinder-piston devices arranged in succession can be arranged substantially parallel to the second cylinder-piston device. In this manner, the axial extent of the hydraulic pressure generator components (that is to say the fist, second and third cylinder-piston devices) can be further reduced.

The above-described problem is further solved by a method for operating an electrohydraulic motor vehicle brake system. The motor vehicle brake system comprises at least a first cylinder-piston device which is to be fluidly coupled with at least one wheel brake of the brake system, wherein the first cylinder-piston device comprises at least one piston, and a second cylinder-piston device having a second piston and having an electromechanical actuator acting on the second piston of the second cylinder-piston device, wherein the second cylinder-piston device is to be fluidly coupled with the first cylinder-piston device, and wherein the second cylinder-piston device is to be fluidly coupled with the first brake circuit and/or the second brake circuit. The method comprises the steps of detecting at least one parameter indicating a driver's intention to brake or a necessity for an intervention by a vehicle dynamics management system, and of operating, by means of the electromechanical actuator, the second piston of the second cylinder-piston device in dependence on the detected parameter in order to generate a hydraulic pressure which serves to operate the first cylinder-piston device or to apply hydraulic pressure directly to the first brake circuit or the second brake circuit.

A parameter indicating a driver's intention to brake can be, for example, an operating path of a brake pedal and/or an operating force acting on the brake pedal.

A parameter indicating a necessity for an intervention by a vehicle dynamics management system can be, for example, an angular rate of the vehicle about a vehicle axis (e.g. yaw rate), a slip value, an acceleration value and/or a speed value of at least one wheel of the motor vehicle. A parameter indicating a necessity for an intervention by a vehicle dynamics management system can, however, also be a distance value from another vehicle. An electronic vehicle dynamics management program can then issue corresponding commands, in dependence on the detected parameter or parameters, for operation of the electromechanical actuator. Operation of the electromechanical actuator takes place in this case in order to establish a specific (e.g. stable) driving condition. Operation of the electromechanical actuator can also take place when an intention of the driver to brake has not been detected (e.g. when establishing a distance from a vehicle ahead).

Operation of the electromechanical actuator can be proportional to or otherwise dependent on the detected parameter value. Within the scope of a regenerative brake system and the possibility of connecting a generator for energy recovery during a braking operation, operation of the electromechanical actuator further depends on whether an intention to brake or a brake command can or should be implemented by the generator. In a regenerative brake system or within the scope of regenerative braking operation, the electromechanical actuator is operated, for example, when the intention to brake or the brake command cannot be implemented by the generator alone.

The method can further comprise a step with which the position of the electromechanical actuator and of the second piston of the second cylinder-piston device to be coupled therewith is detected.

The relative positions of the first piston and of a secondary piston of the first cylinder-piston device relative to one another can be determined on the basis of the detected position of the electromechanical actuator.

On the basis of the detected position of the electromechanical actuator, the hydraulic fluid volume to be supplied to the first brake circuit and/or the second brake circuit can be determined.

On the basis of the detected position of the electromechanical actuator, the distribution of the hydraulic fluid volume delivered from the second cylinder-piston device between the first brake circuit or the second brake circuit and/or the first cylinder-piston device can be determined on the basis of the detected position of the electromechanical actuator.

The determined hydraulic fluid volume to be supplied to the first brake circuit and/or into the second brake circuit can be supplied to the respective brake circuit or circuits. The supply of the determined hydraulic fluid volume takes place sequentially to the first brake circuit and to the second brake circuit, that is to say the hydraulic fluid is supplied to the brake circuits in succession.

Further objects, features, advantages and possible applications will become apparent from the following description of an exemplary embodiment, which is not to be interpreted as limiting, with reference to the accompanying FIGURE. In the FIGURE, all the features which are described and/or depicted show the subject-matter disclosed herein on their own or in any desired combination, also independently of their grouping in the claims or their references. The dimensions and proportions of the components shown in the FIGURE are not necessarily to scale; they can differ from those shown in embodiments for implementation.

BRIEF DESCRIPTION OF THE DRAWINGS

FIG. 1 is an exemplary embodiment of an electrohydraulic motor vehicle brake system.

DETAILED DESCRIPTION OF THE PREFERRED EMBODIMENT

The single FIGURE shows an exemplary embodiment of an electrohydraulic motor vehicle brake system 1000. The variant shown in the FIGURE is a dual circuit brake system with a first brake circuit 300 and a second brake circuit 400. The present invention is not dependent on the number of brake circuits of the brake system 1000.

The brake system 1000 comprises a hydraulic pressure generator assembly group 100, a simulator circuit 200, two brake circuits 300, 400 fluidly coupled with the hydraulic pressure generator assembly group 100, at the end of each of which wheel brakes 302, 304, 402, 404 are fluidly coupled, and a central hydraulic fluid reservoir (not shown). The brake system 1000 further comprises an electronic control unit, or ECU for short (not shown), for controlling the assembly group 100 and valves of the brake system 1000.

The structure and functioning of the hydraulic pressure generator assembly group 100 will be explained in greater detail in the following with reference to the brake system 1000 shown.

The hydraulic pressure generator assembly group 100 comprises a first cylinder-piston device 102, a second cylinder-piston device 104 with an electromechanical actuator 106 acting on the second cylinder-piston device 104, and sensor units 108, 110. The assembly group 100 further comprises a fluid path 112 for fluidly coupling the second cylinder-piston device 104 with the first cylinder-piston device 102, and a force transmission device 114 for optional coupling with the first cylinder-piston device 102. The sensor units 108, 110 serve to quantitatively detect a driver's intention and a hydraulic pressure present in the brake circuits 300, 400. The sensor units 108, 110 are coupled with the ECU (not shown).

As is discussed in greater detail hereinbelow, the assembly group 100 is designed to build up a hydraulic pressure required at the wheel brakes 302, 304, 402, 404 by operation of a first piston 116 of the first cylinder-piston device 102. Operation of the first piston 116 takes place in push-through operation of the brake system 1000 in dependence on the foot force and in normal operation (or brake-by-wire operation) of the brake system 1000 independently of the foot force by hydraulic coupling of the first cylinder-piston device 102 with the second cylinder-piston device 104. The brake system 1000, or the assembly group 100, is usually in normal operation and switches to push-through operation only when the first cylinder-piston device 102 is not hydraulically operable via the second cylinder-piston device 104. This can be the case, for example, if the electromechanical actuator 106 or the electronic controller thereof is not working correctly or fails (e.g. in the event of failure of the vehicle power supply).

The first cylinder-piston device 102 and the second cylinder-piston device 104 fluidly coupled with the first cylinder-piston device 102 will first be described.

The first cylinder-piston device 102 comprises a first piston 116 (called the primary piston hereinbelow) which is displaceably received in a first cylinder 118, and a second piston 120 (called the secondary piston or floating piston hereinbelow) which is displaceably received in the first cylinder 118. The two pistons 116, 120 can each be coupled with a spring device, which spring devices are designed to return the two pistons 116, 120 to their starting position in the unoperated state.

The primary piston 116 and the secondary piston 120 are arranged one behind the other in the first cylinder 118 (tandem principle) and define three hydraulic chambers 122, 124, 126. A first hydraulic chamber 122 is defined by an end face of the primary piston 116 facing away from the operating direction for hydraulic pressure generation (right-hand end face in the FIGURE, called the rear side hereinbelow) and a first cylinder bottom facing the rear side of the primary piston 116. A second hydraulic chamber 124 is defined by an end face of the primary piston 116 facing in the operating direction for hydraulic pressure generation (left-hand end face of the primary piston in the FIGURE) and by an end face of the secondary piston 120 opposite to the operating direction for hydraulic pressure generation. Furthermore, a third hydraulic chamber 126 is defined by an end face of the secondary piston 120 facing in the operating direction for hydraulic pressure generation (left-hand end face of the secondary piston 120 in the FIGURE) and a second cylinder bottom. The first hydraulic chamber 122 and the second hydraulic chamber 124 are thus separated from one another by the displaceably received primary piston 116. Likewise, the second hydraulic chamber 124 and the third hydraulic chamber 126 are separated from one another by the displaceably received secondary piston 120.

The second hydraulic chamber 124 is fluidly coupled with the first brake circuit 300, and the third hydraulic chamber 126 is fluidly coupled with the second brake circuit 400. Furthermore, the second hydraulic chamber 124 and the third hydraulic chamber 126 are fluidly connected in a known manner to an unpressurized hydraulic fluid reservoir.

The first hydraulic chamber 122 is fluidly coupled via the fluid path 112 with the second cylinder-piston device 104. However, it is not fluidly coupled with either of the brake circuits 300, 400. The first hydraulic chamber 122 serves in brake-by-wire braking operation to receive a hydraulic fluid volume conveyed from the second cylinder-piston device 104 within the scope of a pressure build-up phase or pressure maintenance phase, or to deliver received hydraulic fluid to the second cylinder-piston device 104 again within the scope of a pressure reduction phase.

The second cylinder-piston device 104 comprises a second piston 130 which is displaceably received in a second cylinder 128. The second piston 130 is coupled with the electromechanical actuator 106 via a coupling portion 132. The second piston 130 defines a first hydraulic chamber 134 and a second hydraulic chamber 136 in the cylinder 128. The first hydraulic chamber 134 is defined between the active surface 138 of the second piston 130 facing the actuator 106 and a cylinder bottom 140. The second hydraulic chamber 136 is defined by an active surface 142 remote from the electromechanical actuator 106 and a cylinder bottom 144. The first hydraulic chamber 134 is further in direct fluid contact with the first hydraulic chamber 122 of the first cylinder-piston device 102 via the fluid path 112.

The second cylinder-piston device 104 additionally has a direct fluid connection to the two brake circuits 200, 300 of the brake system 1000. The second hydraulic fluid chamber 136 can be fluidly coupled directly with the fluid path 150 of the first brake circuit 300 via the fluid paths 146 and 148. In addition, the second hydraulic fluid chamber 136 can be fluidly coupled directly with the fluid path 154 of the second brake circuit 400 via the fluid paths 146 and 152. For the fluid coupling of the second hydraulic chamber 136 with the first brake circuit 300, a valve arrangement 156 is arranged in the fluid path 148 to the first brake circuit 300. Furthermore, for fluid coupling with the second brake circuit 400, a valve arrangement 158 is provided in the fluid path 152 to the second brake circuit 400. The valve arrangements 156 and 158 can be formed, for example, by an electrically operable valve and a non-return valve. The non-return valve is intended to prevent hydraulic fluid from being able to flow back to the hydraulic chamber 136 from the brake circuits 300, 400 via the fluid paths 146, 148, 152. Via the fluid path 146 and the fluid path 160, which has a valve arrangement 162, hydraulic fluid can additionally be ejected from the second hydraulic chamber 136 into the hydraulic reservoir (not shown). The fluid path with the valve arrangement 162 can be used for reducing a hydraulic pressure that has built up in the brake system 1000.

The second piston 130 is operated via the electromechanical actuator 106. Specifically, the electromechanical actuator 106 is provided for moving the second piston 130 forwards or backwards in the second cylinder 128 in dependence on control signals received from the ECU. In the case of a forward stroke of the piston 130 (the piston 130 moves to the right in the FIGURE), the operating force applied by the actuator 106 is transmitted to the hydraulic fluid in the hydraulic chamber 134. As a result, there is generated in the hydraulic chamber 134 a hydraulic pressure which corresponds to the ratio between the operating force applied by the actuator 106 and the active surface 138 of the second piston 130 on which the operating force acts. Because the first hydraulic chamber 134 is fluidly coupled with the first chamber 122 of the first cylinder-piston device 102 via the fluid path 112, the hydraulic pressure built up in the first hydraulic chamber 134 is transmitted to the first chamber 122. Thus, the hydraulic pressure generated in the hydraulic chamber 134 of the second cylinder-piston device 104 is present at the rear side of the primary piston 116 as operating pressure for the primary piston 116. The built-up operating pressure results in the displacement of the primary piston 116 and of the secondary piston 120 coupled therewith. As a result of the displacement of the primary piston 116 towards the second hydraulic chamber 124, the volume of the first hydraulic chamber 122 increases, while the volume of the second hydraulic chamber 124 and of the third hydraulic chamber 126 of the first cylinder-piston device 102 decreases. Owing to the operation of the second piston 130, the increasing volume of the first hydraulic chamber 122 is continuously supplied with hydraulic fluid displaced from the hydraulic chamber 134 of the second cylinder-piston arrangement 104, so that the operating pressure on the rear side of the primary piston 116 is constantly maintained.

The displacement of the primary piston 116 has the result that the hydraulic pressure in the second and third chambers 124, 126, and in the brake circuits 300, 400 and wheel brakes 302, 304 and 402, 404 coupled therewith, increases steadily. The displacement of the piston 116 continues until a hydraulic pressure has become established in the hydraulic chambers 124, 126 fluidly coupled with the wheel brakes 302, 304 and 402, 404 via the fluid paths 150, 154 that corresponds to the operating pressure in the first hydraulic chamber 122 of the first cylinder-piston device 102, or in the first hydraulic chamber 134 of the second cylinder-piston device 104. The hydraulic pressure generated at the wheel brakes 302, 304 and 402, 404 by hydraulic operation of the primary piston 116 thus corresponds to the operating pressure generated in the second cylinder-piston device 104.

Conversely, in the case of a return stroke of the second piston 130, the operating pressure in the first hydraulic chamber 134 falls, so that hydraulic fluid is able to flow from the first hydraulic chamber 122 of the first cylinder-piston device 102 back into the first hydraulic chamber 134 of the second cylinder-piston device 104 again via the fluid path 112. However, in the case of a return stroke of the second piston 130, hydraulic fluid from the second hydraulic chamber 136 of the second cylinder-piston device 104 can also be applied directly to one of the brake circuits 300 and 400. In the case of a return stroke of the piston 130 (the piston 130 moves to the left in the FIGURE), the operating force applied by the actuator 106 is transmitted to the hydraulic fluid in the hydraulic chamber 136. As a result, a hydraulic pressure is generated in the hydraulic chamber 136 which corresponds to the ratio between the operating force applied by the actuator 106 and the active surface 138 of the second piston 130 on which the operating force acts. Because the first hydraulic chamber 136 can be fluidly coupled via the fluid paths 146, 148, 150, 152 and 154 with the first brake circuit 300 or the second brake circuit 400, the hydraulic pressure generated by the second cylinder-piston device 104 in the case of a return stroke of the piston 130 can be transmitted directly to one of the brake circuits 300, 400. With which of the brake circuits 300, 400 the second hydraulic chamber 136 is to be coupled depends on the positions of the valve arrangements 156 and 158, which are controlled by the ECU.

In the case of a return stroke of the second piston 130, the volume flow of the hydraulic fluid can be divided at a branching point 164 between the fluid paths 148, 150 and at a branching point 166 between fluid paths 152, 154. For example, in the case of control of the wheel brakes 302, the volume flow of hydraulic fluid delivered from the second hydraulic chamber 136 can be supplied in a variable volume flow proportion to the wheel brake 302 via the paths 146, 148, the branching point 166 and the path portion 150a. The size of this volume flow proportion can be variably controlled or adjusted via the valves 306 and 308 which are associated with the wheel brakes 302 and 304. The other volume flow proportion can be supplied to the second hydraulic chamber 124 of the first cylinder-piston device 102 via paths 146, 148, the branching point 166 and the path 150b. This volume flow proportion serves to supply hydraulic fluid to the second hydraulic chamber 124 in order to allow the fluid pressure in the brake circuits 300, 400 to be maintained.

The same is also possible in the second brake circuit 400. The volume flow can be divided in the second brake circuit 400 at the branching point 166 between the fluid path 152 and the fluid path 154 and supplied via the path 154b partly to the hydraulic chamber 126 and via the path 154a partly to one of the wheel brakes 402 or 404.

Because the hydraulic chambers 134, 136 of the second cylinder-piston device 104 are completely filled with hydraulic fluid at all times and hydraulic fluid is not compressible, the operating pressure built up in the chambers 134, 136 is transmitted to the primary piston 116 or the two brake circuits 300 and 400 without a pressure drop and without a time delay (retardation). In other words, that operating pressure in the hydraulic chambers 134, 136 is transmitted without loss to the primary piston 116 or to one of the brake circuits 300, 400, so that it is operated accordingly. If, for example, an operating pressure is built up by a forward stroke of the piston 130, a corresponding displacement of the primary piston 116 will take place as a result of the acting operating pressure and a corresponding hydraulic pressure is built up at the wheel brakes 302, 304 or 402, 404. If, for example, a built-up operating pressure is reduced by a return stroke of the piston 130, the primary piston 116 is correspondingly moved back and the hydraulic pressure at the wheel brakes 302, 304 or 402, 404 is correspondingly lowered or reduced. As already mentioned, operating pressure for operating one of the wheel brakes 302, 304 or 402, 404 can also be applied directly to one of the two brake circuits 300, 400 via a return stroke of the piston 130 in the hydraulic chamber 136. In this case, however, hydraulic fluid is at the same time also conveyed into the first cylinder-piston arrangement 102, so that the pistons 116 and 120 of the first cylinder-piston device 102 are displaced and can assume their predetermined positions. The strength of the operating pressure depends on the electromechanical actuator 106 and the second piston 130. As a result of the present serial hydraulic coupling of the first cylinder-piston device 102 with the second cylinder-piston device 104, a hydraulic pressure can be generated or established at the wheel brakes 302, 304 or 402, 404 without loss and equally as quickly as if the electromechanical actuator 106 were coupled directly with the first primary piston 116 and operation of the primary piston 116 were to take place directly by the electromechanical actuator 106.

The coupling of the electromechanical actuator 106 with a second cylinder-piston device 104 fluidly coupled with the first cylinder-piston device 102 instead of a direct coupling of the electromechanical actuator 106 with the first cylinder-piston device 102 further permits a transformation of the operating force to be provided at the primary piston 116 because, for each desired hydraulic pressure at the wheel brakes 302, 304 or 402, 404, a specific operating force must be applied to the primary piston 116 or to the secondary piston 120, which operating force corresponds to the product of the hydraulic pressure to be generated and an effective piston surface of the primary piston 116 on which the hydraulic pressure acts (active surface). The larger the active surface of the primary piston 116, the greater the operating force to be applied.

The electromechanical actuator 106 comprises an electric motor 168 and a ball screw 170 coupled with the electric motor 168, which ball screw serves as a gear mechanism. The ball screw 170 has a spindle 172 and a nut 174 which are coupled together via a ball arrangement. A rotor (not shown) of the electric motor 168 is coupled with the nut 174 for conjoint rotation in order to set it in rotation. A rotary movement of the nut 174 is transmitted to the spindle 172 in such a manner that the spindle 172 is displaced axially. The end face of the spindle 172 on the left in the FIGURE is mechanically coupled with the second piston 130. An axial displacement of the spindle 172 is thus transmitted directly to the second piston 130, whereby the second piston is displaced in the second cylinder 128 along the cylinder 128. The second piston 130 has a piston rod portion 176 with the coupling portion 132, which is coupled with the spindle 172. In the second cylinder 128, the first hydraulic chamber 134 is defined around the piston rod 176 between the active surface 138 and the cylinder wall 140. The piston rod 174 ends at the active surface 134 of the piston 130.

The electric motor 168 is provided with a sensor unit 176 with which the position of the motor 168 can be detected. The sensor unit 176 can comprise an encoder, for example, which is able to detect an angle of rotation of the motor 168. The position of the second piston 130 can be determined on the basis of the position of the motor 168. The position of the second piston 130 further provides information about how the volumes in the brake circuits 300, 400 have developed and the positions which the first piston 116 and the second piston 120 have assumed in the first cylinder 118. The sensor unit 176 can be connected to the ECU.

A pedal interface 500 having a third cylinder-piston device 502 and the foot-force-dependent operation of the pistons 116, 120 of the first cylinder-piston device 102 with the aid of the pedal interface 500 will be described in greater detail hereinbelow.

The pedal interface 500 comprises a third hydraulic cylinder 504 with a third piston 506 displaceably received therein. The cylinder 504 and the piston 506 in turn define a hydraulic chamber 508, which is fluidly coupled with the simulator circuit 200 of the brake system 1000. The hydraulic chamber 508 is further fluidly to be coupled via a fluid path 510 and a valve arrangement 512 received therein either with the central hydraulic fluid reservoir (not shown), with the hydraulic chamber 122 or with the first brake circuit 300.

The third piston 506 is further provided with a first plunger 514 and with a second plunger 516. The first plunger 514 is fixed at a first end to an end face of the third piston 506 facing a brake pedal 516. A second end of the first plunger 514 is mechanically coupled with a brake pedal 518. In this manner, an operation of the pedal (i.e. depression of the brake pedal 518) can be transmitted to the third piston 506, which is then displaced in the direction of travel (to the left in the FIGURE). The second plunger 516 is fixed to an end face of the third piston 506 facing in the direction of travel.

The first cylinder 118 of the first cylinder-piston device 102 has a tubular shaft 520 for receiving the plunger 516 protruding from the third cylinder-piston device 502. In the mounted state, the plunger 516 projects into the shaft 520 of the first cylinder-piston device 102 and is spatially separated from the primary piston 116 by only a narrow gap 522. In the configuration shown, the primary piston 116 has on its rear side a U-shaped profile, the shaft 520 projecting into the U-shaped recess of the primary piston 116. The hydraulic chamber 122 is defined by the rear side of the piston and the inside wall of the first cylinder 118 and of the shaft 520.

The plunger 516 serves as a force transmission device for transmitting a foot force to the primary piston 116 in push-through operation. In push-through operation, there is no electrohydraulic operation of the primary piston 116. The gap 522 between the plunger 516 and the rear side of the primary piston 116 can quickly be closed when the pedal 518 is depressed. The second plunger 516 comes into contact with the primary piston 116 and transmits any further movement of the pedal 518 directly to the primary piston 116, whereby a hydraulic pressure can be built up in the first cylinder-piston device 102. In brake-by-wire operation, the primary piston 116 is operated by the operating pressure built up in the second cylinder-piston device 104. Hydraulic operation of the primary piston 116 has the effect that the primary piston 116 is sufficiently in advance of the plunger 516, so that in brake-by-wire operation the gap 522 cannot be closed by depressing the brake pedal 518. In this manner it can be ensured that, in brake-by-wire operation, the hydraulic pressure is built up or established only with the aid of the second cylinder-piston device 104.

The fluid path 510 divides downstream of the valve 512 into three branches 524, 526, 528. The first branch 524 leads via a valve 530 into the hydraulic chamber 122 of the first cylinder-piston device 102. The second branch 526 leads via the valve 532 into the hydraulic reservoir. The third branch 528 opens into the fluid path 150 of the first brake circuit. An overpressure valve 534 is arranged in the third branch 528. In normal operation of the brake system 1000, the valve 512 is switched into a closed state, so that the valves 530, 532, 534 arranged downstream thereof are of no significance.

In a push-through braking operation, the valve 512 remains unoperated and thus in an open valve position. Hydraulic fluid displaced from the hydraulic cylinder 504 in push-through operation can then flow via the open valve 512 to the valves 530, 532, 534 arranged downstream and flow via those valves (in dependence on the hydraulic pressure in the first brake circuit 300) into the first brake circuit 300, into the hydraulic chamber 122 or into the hydraulic fluid reservoir.

In push-through brake operation, hydraulic fluid can be guided into the hydraulic chamber 122 via the valve 530 in the open state thereof, in order to assist with displacement of the piston 116 in the operating direction in push-through brake operation.

When a given pressure is reached in the first cylinder-piston device 102 or in the first brake circuit 300, the valve 532 switches from a closed state into an open state. The valve 532 is fluidly coupled with the first brake circuit 300 (see the broken line at the valve 532 in the FIGURE) for control purposes. When the given pressure is reached in the first brake circuit 300, the valve 532 switches into an open valve position. The hydraulic fluid accumulated during push-through operation in the fluid path 510 and at the valve inlets of the valves 532, 534 can then flow unpressurized into the unpressurized hydraulic fluid reservoir via the second part path 526. The second valve 532 accordingly specifies how long hydraulic fluid is supplied from the third cylinder-piston device 502 to the brake circuits 300, 400. In particular, the valve 532 prevents an unnecessary accumulation of hydraulic fluid at the valve 534 if, for example during the push-through phase, the pressure generated in the first cylinder-piston device 102 comes close to or even exceeds the pressure generated in the third cylinder 504.

The valve 534 is in the form of a non-return valve. The non-return valve 534 is so arranged that, in the open valve position, it only allows hydraulic fluid to flow from the hydraulic cylinder 504 into the first brake circuit 300 but completely prevents a flow in the opposite direction. The first non-return valve 134 is in the form of a spring-loaded non-return valve. Accordingly, in push-through operation, hydraulic fluid can be supplied from the third hydraulic cylinder 504 via the valve 512 (this valve is open in push-through operation) and the downstream non-return valve 534 to the first brake circuit 300 (and via the first cylinder-piston device 102 fluidly coupled therewith also to the second brake circuit 400) whenever the hydraulic pressure generated by displacement of the third piston 506 in the third cylinder 504 is higher than the valve overflow pressure and the hydraulic pressure present at the valve outlet of the non-return valve 534.

The simulator circuit 200 will be described hereinbelow. The simulator circuit 200 is fluidly coupled with the third cylinder-piston device 502. The simulator circuit 200 comprises a hydraulic pressure accumulator 202 which is fluidly coupled with the chamber 508 via a fluid path 204 (and a throttle valve or throttle non-return valve arranged therein). The hydraulic pressure accumulator 202 is in the form of a piston-cylinder arrangement, the piston 208 displaceably received in the cylinder 206 being biased by a spring. On operation of the brake pedal 518 in normal operation (the third piston 506 is not coupled with the primary piston 116 so that no counter-force reacts on the brake pedal 518), the hydraulic fluid conveyed from the chamber 508 is guided via the fluid path 204 into the hydraulic pressure accumulator 202. The fluid flowing into the hydraulic pressure accumulator 202 thereby displaces the piston 208 biased by the spring. The force to be applied to displace the piston 208 reacts on the brake pedal 516 as pedal restoring force. In other words, the hydraulic pressure accumulator 202 generates a counter-pressure which reacts on the third piston 506 and on the brake pedal 518. In this manner, in brake-by-wire operation a counter-force acting on the brake pedal 518 is generated which does not derive from the pressure build-up in the first cylinder-piston device 102, because the third cylinder-piston device 502 is decoupled from the first cylinder-piston device 102. A valve arrangement 210 and a sensor unit 212 are provided in the fluid path 204.

In push-through operation, the third piston 506 is coupled with the primary piston 116. The pedal reaction behavior is determined by the hydraulic pressure generated by the primary piston 116. A reaction behavior does not need to be simulated in this case. The hydraulic fluid displaced from the chamber 508 can be diverted via the valve arrangement 512 into the hydraulic fluid reservoir (not shown), the hydraulic chamber 122 or the first brake circuit 300.

The brake system 1000 comprises a first group of four electrically operable valves 306, 308, 406, 408, exactly one valve 306, 308, 406, 408 being associated with each wheel brake 302, 304, 402, 404. The valve 306, 308, 406, 408 associated with a wheel brake 302, 304, 402, 404 is designed hydraulically to couple or hydraulically to decouple the wheel brake 302, 304, 402, 404 from the first cylinder-piston device 102 or from the second cylinder-piston device 104 according to the switching state of the valve 306, 308, 406, 408. The time control of the individual valves 306, 308, 406, 408 is carried out via the ECU.

For example, the valves 306, 308, 406, 408 can be operated by the ECU by time multiplexing. At least one time slot for a valve operation can thereby be associated with each valve 306, 308, 406, 408 (and thus with each wheel brake 302, 304, 402, 404). This association does not exclude the possibility of individual valves 306, 308, 406, 408 remaining open or closed over a plurality of time slots or more than two valves being opened at the same time. In this manner, in the case of service braking (when the assembly group 100 is in normal operation), the hydraulic pressure built up by the actuator assembly group 100 can be adjusted at the individual wheel brakes 302, 304, 402, 404 or at individual wheel brake groups for the purpose of vehicle dynamics management (that is to say, for example, in ABS- and/or ASR- and/or ESP-controlled operation).

The brake system 1000 further comprises a second group of four valves 310, 312, 410, 412, exactly one valve 310, 312, 410, 412 being associated with each wheel brake 302, 304, 402, 404. The valves 310, 312, 410, 412 are arranged in return lines 314, 414 of the wheel brakes 302, 304, 402, 404. The return lines 314, 414 open into the hydraulic fluid reservoir (not shown). The two valves 310, 312, 410, 412 each assume a closed valve position in the unoperated state, so that no hydraulic fluid is able to flow from the respective wheel brakes 302, 304, 402, 404 into the unpressurized hydraulic fluid reservoir (not shown). They can be switched into an open valve position in the course of a vehicle dynamics management operation (e.g. ABS- and/or ASR- and/or ESP-controlled operation) by means of electrical control of the ECU, in order to allow hydraulic fluid to flow into the unpressurized hydraulic fluid reservoir in a controlled manner via the respective brake circuits.

In summary, the brake system 1000 described herein having the hydraulic pressure generator assembly group 100 is designed to carry out brake-by-wire brake operation and push-through brake operation. The brake system 1000 has brake circuits 300, 400 which are completely fluidly separate. The brake system 1000 is so constructed that a predetermined hydraulic pressure is maintained in each of the two fluidly separate brake circuits 300, 400.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. An electrohydraulic motor vehicle brake system comprising:
    a first brake circuit with at least one wheel brake,
    a second brake circuit with at least one wheel brake,
    a first cylinder-piston device to be fluidly coupled with at least one of the first or the second brake circuit for hydraulic pressure generation in at least one of the first or the second brake circuit, wherein the first cylinder-piston device comprises at least one first piston,
    a second cylinder-piston device which comprises at least one second piston, and
    an electromechanical actuator which acts on the second piston of the second cylinder-piston device,
    wherein the second cylinder-piston device is to be fluidly coupled with the first cylinder-piston device in order to provide a hydraulic pressure which is generated in the second cylinder-piston device upon an operation of the electromechanical actuator for an operation of the first cylinder-piston device, and wherein the second cylinder-piston device is to be fluidly coupled with the first brake circuit and/or the second brake circuit in such a manner that upon an operation of the electromechanical actuator of the second cylinder-piston device the first and/or the second brake circuit are to be directly applied with a hydraulic pressure which is generated in the second cylinder-piston device;
    wherein the second piston of the second cylinder-piston device divides the cylinder of the second cylinder-piston device into a first hydraulic chamber and a second hydraulic chamber;
    wherein the first hydraulic chamber is to be fluidly coupled with the first cylinder-piston device; and
    wherein the second hydraulic chamber is to be fluidly coupled with the first and/or the second brake circuit.

2. The electrohydraulic brake system as claimed in claim 1, wherein the first hydraulic chamber is to be fluidly coupled with the first brake circuit and/or the second brake circuit.

3. The electrohydraulic brake system as claimed in claim 1, wherein the second hydraulic chamber is to be fluidly coupled with the first cylinder-piston device.

4. The electrohydraulic brake system as claimed in claim 3, wherein, in order to change the volume of the first hydraulic chamber and of the second hydraulic chamber, the second piston of the second cylinder-piston device is displaceable in a first operating direction and in a second operating direction.

5. The electrohydraulic brake system as claimed in claim 4, wherein at least one sensor unit is provided, which sensor unit detects the position of the electromechanical actuator.

6. The electrohydraulic brake system as claimed in claim 5, wherein at least one control unit is configured to determine the relative positions of the first piston and of a secondary piston of the first cylinder-piston device relative to one another on the basis of the signals of the at least one sensor unit.

7. The electrohydraulic brake system as claimed in claim 6, wherein the at least one control unit is configured to determine the position of the second piston of the second cylinder-piston device on the basis of the signals of the at least one sensor unit.

8. The electrohydraulic brake system as claimed in claim 7, wherein the control unit is configured to specify the distribution of the hydraulic fluid volume delivered from the second cylinder-piston device between the first brake circuit or the second brake circuit and/or the first cylinder-piston device on the basis of the signals of the at least one sensor unit.

9. The electrohydraulic brake system as claimed claim 8, wherein the first cylinder-piston device and the second cylinder-piston device are fluidly connected in series via a fluid path.

10. The electrohydraulic brake system as claimed in claim 9, wherein the second cylinder-piston device is connected directly to the first brake circuit via a fluid path and directly to the second brake circuit via a further fluid path, wherein each of the fluid paths has at least one controllable valve.

11. A method for operating an electrohydraulic motor vehicle brake system having a first cylinder-piston device, which is to be fluidly coupled with a first brake circuit and a second brake circuit, for generating hydraulic pressure in at least one of the two brake circuits, wherein the first cylinder-piston device comprises at least one first piston, a second cylinder-piston device having a second piston and having an electromechanical actuator which acts on the second piston of the second cylinder-piston device, wherein the second cylinder-piston device is to be fluidly coupled via a first hydraulic chamber with the first piston of the first cylinder-piston device, and wherein the second cylinder-piston device is to be fluidly coupled via a second hydraulic chamber directly with the first brake circuit and/or the second brake circuit, wherein the method comprises the following steps:
    detecting at least one parameter indicating a driver's intention to brake or a necessity for an intervention by a vehicle dynamics management system;
    operating, by means of the electromechanical actuator, the second piston of the second cylinder-piston device in dependence on the detected parameter in order to generate a hydraulic pressure which serves to operate the first cylinder-piston device or to apply hydraulic pressure directly to the first brake circuit or the second brake circuit.

12. The method as claimed in claim 11, wherein the method further comprises:
    detecting the position of the electromechanical actuator and of the second piston of the second cylinder-piston device which is to be coupled therewith.

13. The method as claimed in claim 12, wherein the method further comprises:
    determining the relative positions of the first piston and of a secondary piston of the first cylinder-piston device relative to one another on the basis of the detected position of the electromechanical actuator.

14. The method as claimed in claim 13, wherein the method further comprises:
    determining the volume of hydraulic fluid to be supplied to the first brake circuit and/or the second brake circuit on the basis of the detected position of the electromechanical actuator.

15. The method as claimed in claim 14, wherein the method further comprises:
    determining the distribution of the volume of hydraulic fluid delivered from the second cylinder-piston device between the first brake circuit and the second brake circuit and/or the first cylinder-piston device on the basis of the detected position of the electromechanical actuator.

16. The method as claimed in claim 15, wherein the method further comprises:
    supplying the determined volume of hydraulic fluid to be supplied to the first brake circuit and/or the second brake circuit, wherein the supply of the determined volume of hydraulic fluid to the first brake circuit and to the second brake circuit takes place sequentially.

* * * * *